United States Patent
Kadous et al.

(10) Patent No.: US 8,412,183 B1
(45) Date of Patent: Apr. 2, 2013

(54) AUTOMATICALLY CONSTRUCTING PATHS

(75) Inventors: Mohammed Waleed Kadous, Sunnyvale, CA (US); Andrew Lookingbill, Palo Alto, CA (US); Scott Ettinger, San Carlos, CA (US)

(73) Assignee: Google Inc., Mountain View, CA (US)

( * ) Notice: Subject to any disclaimer, the term of this patent is extended or adjusted under 35 U.S.C. 154(b) by 144 days.

(21) Appl. No.: 13/108,127

(22) Filed: May 16, 2011

(51) Int. Cl.
*H04W 24/00* (2009.01)

(52) U.S. Cl. ..... 455/425; 455/423; 455/424; 455/456.1; 455/456.3; 455/456.6; 455/457; 455/446; 455/67.11; 455/67.13; 709/223; 709/224

(58) Field of Classification Search .......... 455/423–425, 455/414.1–414.4, 456.1–456.6, 457, 446, 455/448, 67.11, 67.13, 41.1–41.2; 709/220–224
See application file for complete search history.

(56) References Cited

U.S. PATENT DOCUMENTS

| | | | |
|---|---|---|---|
| 6,272,172 B1 * | 8/2001 | Deshpande et al. | 375/228 |
| 7,058,414 B1 * | 6/2006 | Rofheart et al. | 455/456.4 |
| 7,167,715 B2 * | 1/2007 | Stanforth | 455/457 |
| 7,250,907 B2 | 7/2007 | Krumm et al. | |
| 7,522,908 B2 * | 4/2009 | Hrastar | 455/411 |
| 7,970,394 B2 * | 6/2011 | Behroozi et al. | 455/423 |
| 2002/0129138 A1 * | 9/2002 | Carter | 709/224 |
| 2005/0036487 A1 * | 2/2005 | Srikrishna | 370/389 |
| 2006/0224730 A1 * | 10/2006 | Fok et al. | 709/224 |
| 2010/0039929 A1 | 2/2010 | Cho et al. | |
| 2011/0018732 A1 | 1/2011 | Cho et al. | |

* cited by examiner

*Primary Examiner* — Tuan A Tran
(74) *Attorney, Agent, or Firm* — Lerner, David, Littenberg, Krumholz & Mentlik, LLP

(57) ABSTRACT

Aspects of the present disclosure relate generally to generating reliable data for indoor navigation. More specifically, aspects relate to identifying a route for a person to follow in order to record data such wireless network access location or other beacon signal information and signal strengths for an indoor space. In one example, the pre-defined route may be generated based on a map of the indoor space, a set of pre-defined walking strategies, an average walking speed, a time limit, and an optimization goal. For example, if a person is able walk at some average speed for a set period of time, a route may be identified which provides a given density of data points (the optimization goal) within the indoor space. The collected data may then used to build a wireless network model of the indoor space for navigation.

20 Claims, 10 Drawing Sheets

AUTOMATICALLY CONSTRUCTING PATHS

BACKGROUND

Modern smartphone devices are equipped with location-based features. These devices use signals from GPS satellites to identify a location, determine a direction of motion, and other navigation functions. However, in locations where the GPS satellite signals are weak, for example, when these devices are indoors, GPS may not function well or at all.

As an alternative, these devices may use other information, such as wireless network signals, Bluetooth, compasses and accelerometers as well as existing floor plans and pre-generated databases or indices of measurements. However, creating such databases and indices may be slow and costly. For example, in order to enable reliable and effective localization in a particular building, data must be collected throughout the building. This may require having an individual walk a collection device, such as a mobile phone, through every single location in the building in order to collect all of the data. However, without a pre-defined collection path, the person may fail to collect data where needed or may spend too much time or two little time in a particular area.

SUMMARY

One aspect of the disclosure provides a method for generating routes for collecting data points in an indoor space. The method includes identifying a map of the indoor space; identifying an optimization goal for collecting data points in the indoor space; accessing a plurality of templates including strategies for walking through indoor spaces; selecting, by a processor, a set of templates from the plurality of templates based on the map and the optimization goal; and generating a route for collecting data points in the indoor space based on the selected set of templates.

In one example, the method also includes receiving, from a client device, information identifying the indoor space, and identifying the map is based on the received information identifying the indoor space. In another example, the method also includes identifying a time parameter and selecting the set of templates is also based on the identified time parameter. In yet another example, identifying the time parameter includes receiving, from a client device, a time parameter of a user. In a further example, the method also includes identifying a walking speed and selecting the set of templates is also based on the identified walking speed. In another example, identifying the walking speed includes receiving, from a client device, a walking speed of a user. In another example, the optimization goal includes a specific density of data points in the indoor space. In yet another example, the map of the indoor space includes a plurality of hallways, the strategies for walking through the indoor spaces include strategies for walking through hallways, and the subset of templates are selected based on the plurality of hallways and the strategies for walking through hallways. In a further example, the map of the indoor space includes a plurality of rooms, the strategies for walking through the indoor spaces include strategies for walking through rooms, and the subset of templates are selected based on the plurality of rooms and the strategies for walking through rooms. In another example, the method also includes transmitting the route to a client device.

Another aspect of the disclosure provides a method of collecting data points along a route through an indoor space. The method includes transmitting, to a server, a request for the route. The request includes information identifying the indoor space. The method also includes receiving a route based on the indoor space and an optimization goal; displaying, by a processor, the route on a display of a client device; collecting data points along the route, each data point including wireless network access location identifiers and associated signal strengths; and transmitting the collected data points to the server.

In one example, the request further includes a time parameter and the route is based on the time parameter. In another example, the method includes receiving, by the client device, input from a user identifying the time parameter. In yet another example, the request further includes a walking speed and the route is based on the walking speed. In a further example, the method also includes receiving, by the client device, input from a user identifying the walking speed.

Yet another aspect of the disclosure provides a device for generating routes for collecting data points in an indoor space. The device includes memory storing a plurality of templates including strategies for walking through indoor spaces. The device also includes a processor coupled to the memory. The processor is operable to identify a map of the indoor space; identify an optimization goal for collecting data points in the indoor space; select a set of templates from the stored plurality of templates based on the map and the optimization goal; and generate a route for collecting data points in the indoor space based on the selected set of templates.

In one example, the processor is also operable to receive, from a client device, information identifying the indoor space and the processor identifies the map based on the received information identifying the indoor space. In another example, the processor is also operable to identify a time parameter and the processor selects the set of templates based on the time parameter. In yet another example, the processor is also operable to receive, from a client device, a time parameter associated with a user and the processor selects the set of templates based on the received time parameter. In a further example, the processor is further operable to identify a walking speed and the processor selects the set of templates based on the walking speed. In another example, the processor is further operable to receive, from a client device, a walking speed of a user the processor selects the set of templates based on the received walking speed. In yet another example, the optimization goal includes a specific density of data points in the indoor space. In a further example, the map of the indoor space includes a plurality of hallways, the strategies for walking through the indoor spaces include strategies for walking through hallways, and the subset of templates are selected by the processor based on the plurality of hallways and the strategies for walking through hallways. In another example, the map of the indoor space includes a plurality of rooms, the strategies for walking through the indoor spaces include strategies for walking through rooms, and the subset of templates are selected by the processor based on the plurality of rooms and the strategies for walking through rooms. In yet another example, the processor is further operable to transmit the route to a client device.

Still a further aspect of the disclosure provides a device for collecting data points along a route through an indoor space. The device includes a display and a processor coupled to the display. The processor is operable to transmit to a server, a request for the route, the request including information identifying the indoor space; receive a route based on the indoor space, a time parameter, a walking speed, and an optimization goal; display the route on the display; collect data points along the route, each data point including wireless network access location identifiers and associated signal strengths; and transmit the collected data points to the server.

In one example, the processor is further operable to receive input identifying the time parameter from a user and transmit the time parameter to the server. In another example, the processor is further operable to receive input identifying the walking speed from a user and transmit the walking speed to the server.

DETAILED DESCRIPTION

In one exemplary embodiment, a server may identify a map (or floor plan) of an indoor space. For example, the map may be identified based on information received from a participant or provided to the server by an administrator. The server may identify a time parameter. The time parameter may also be identified based on information received from the participant or provided to the server by an administrator. The server identifies a walking speed. This walking speed may also be identified based on information received from the participant or retrieved from memory accessible by the server. The server also identifies an optimization goal. For example, the optimization goal may be a specific density of data points for the map or for sections of the map.

The server then accesses a plurality of templates for walking through the indoor space. The server selects a set of templates based on the floor plan, the time parameter, the walking speed, and the optimization goal. The selected set of templates is used to generate a route through the indoor space. The server may then transmit the route to a client device.

Figure 1:
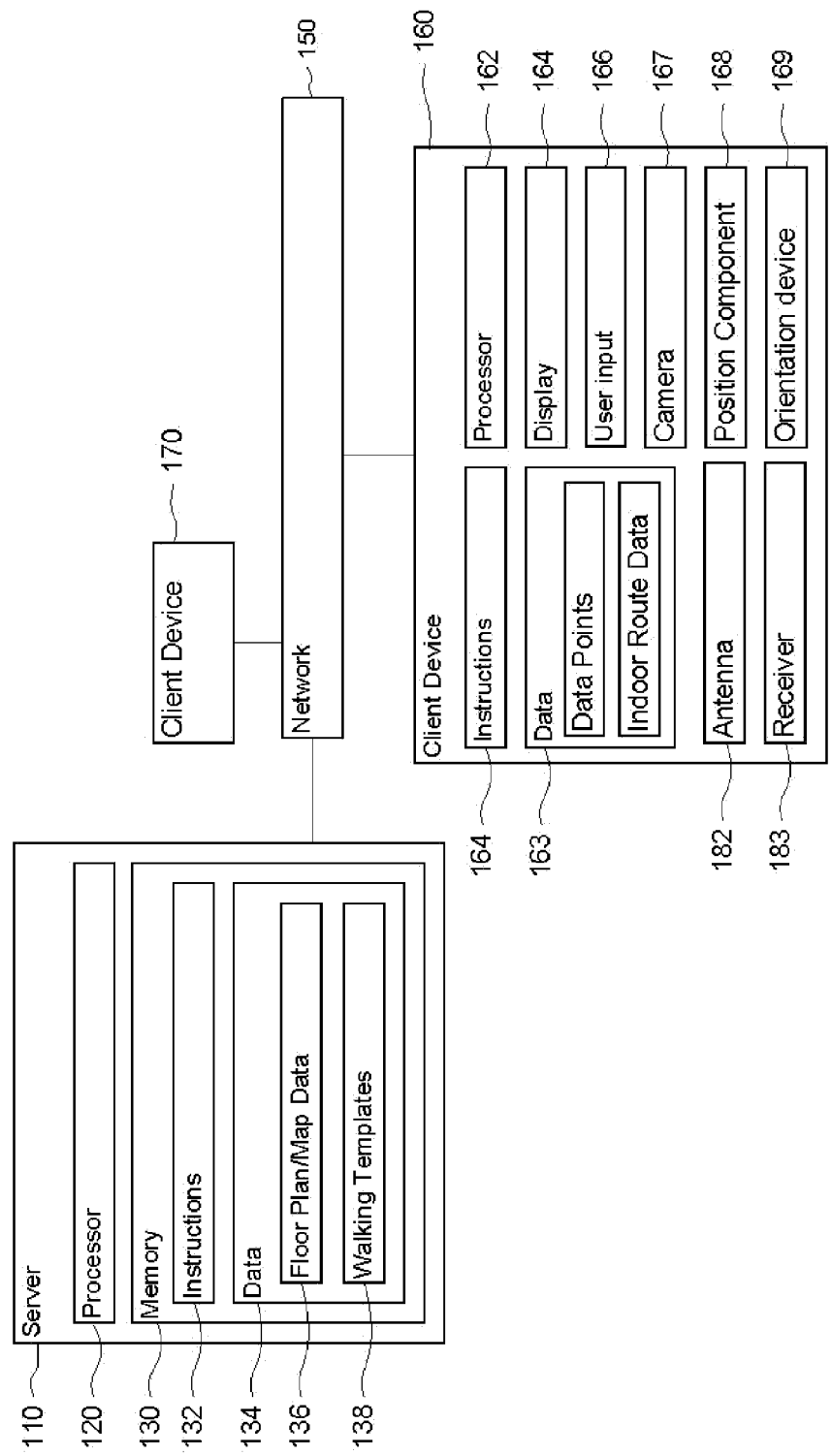
FIG. 1 is a functional diagram of a system in accordance with an exemplary embodiment.
Figure 2:
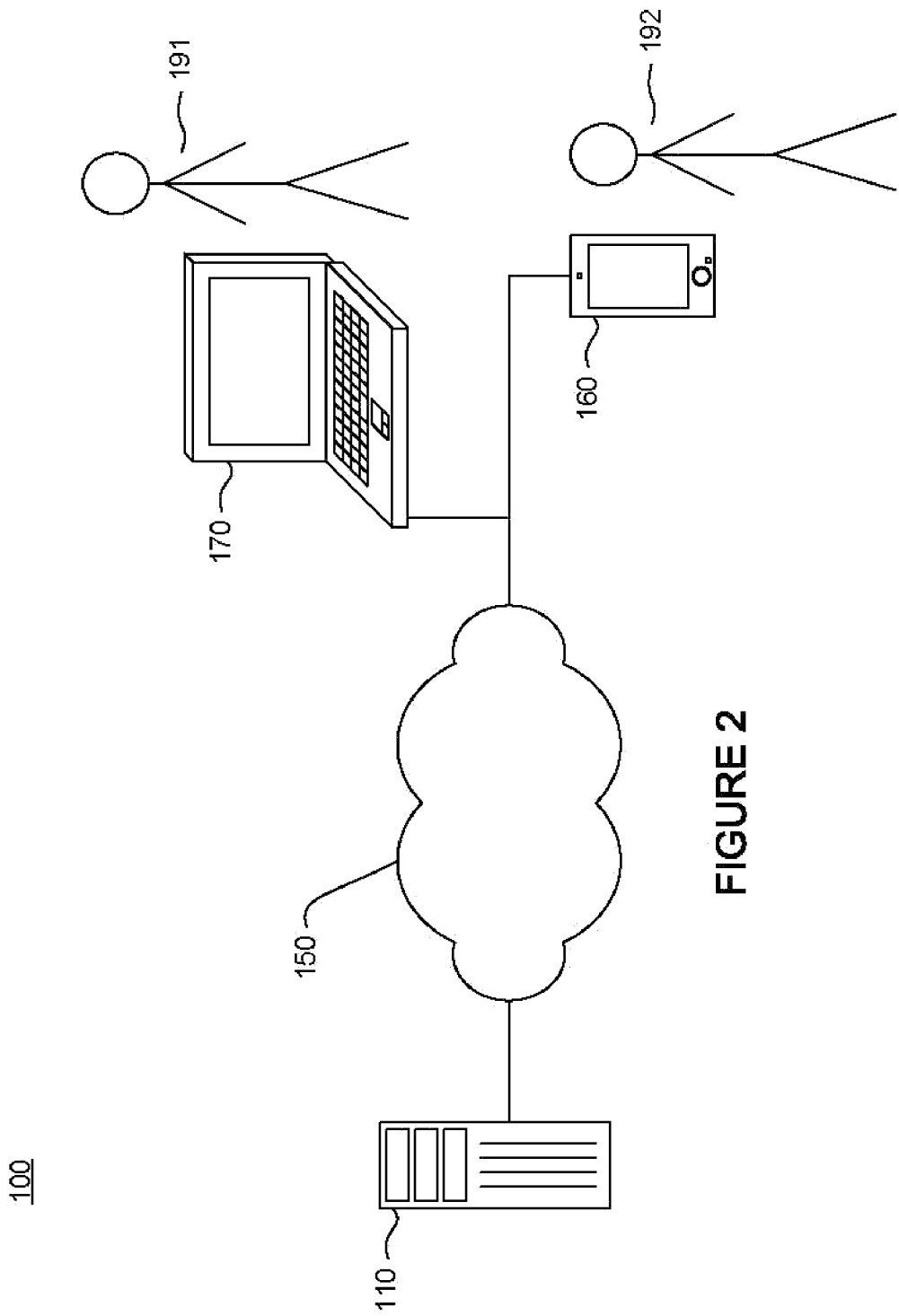
FIG. 2 is a pictorial diagram of the system of FIG. 1.

As shown in FIGS. 1-2, a system 100 for use with an exemplary embodiment includes a computer 110 containing a processor 120, memory 130 and other components typically present in general purpose computers.

The memory 130 stores information accessible by processor 120, including instructions 132, and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as commercially available CPUs. Alternatively, the processor may be a dedicated controller such as an ASIC or other hardware-based processor. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor, memory, or computer will be understood to include references to a collection of processors, memories or computers that may or may not operate in parallel.

The computer 110 may be at one node of a network 150 and capable of directly and indirectly communicating with other nodes of the network. For example, computer 110 may comprise a web server that is capable of communicating with client devices 160 and 170 via network 150 such that server 110 uses network 150 to transmit and present information to a user on display 165 of client device 170. Server 110 may also comprise a plurality of computers that exchange information with different nodes of a network for the purpose of receiving, processing and transmitting data to the client devices. In this instance, the client devices will typically still be at different nodes of the network than any of the computers comprising server 110.

The server 110 and client computers 160 and 170 are capable of direct and indirect communication, such as over network 195. Although only a few computers are depicted in FIGS. 1-2, it should be appreciated that a typical system can include a large number of connected computers, with each different computer being at a different node of the network 195. The network, and intervening nodes, may comprise various configurations and protocols including the Internet, World Wide Web, intranets, virtual private networks, wide area networks, local networks, private networks using communication protocols proprietary to one or more companies, Ethernet, WiFi (such as 802.11, 802.11b, g, n, or other such standards), and HTTP, and various combinations of the foregoing. Such communication may be facilitated by any device capable of transmitting data to and from other computers, such as modems (e.g., dial-up, cable or fiber optic) and wireless interfaces.

Each client device may be configured similarly to the server 110, with a processor, memory and instructions as described above. Each client device 160 or 170 may be a personal computer intended for use by a person 191-192, and have all of the components normally used in connection with a personal computer such as a central processing unit (CPU) 162, memory (e.g., RAM and internal hard drives) storing data 163 and instructions 164, an electronic display 165 (e.g., a monitor having a screen, a touch-screen, a projector, a television, a computer printer or other device that is operable to display information), end user input 166 (e.g., a mouse, keyboard, touch-screen or microphone). The client device may also include a camera 167, geographic position component 168, speakers, a network interface device, and all of the components used for connecting these elements to one another.

Although the client devices 160 and 170 may each comprise a full-sized personal computer, they may alternatively comprise mobile devices capable of wirelessly exchanging data with a server over a network such as the Internet. By way of example only, client device 160 may be a wireless-enabled PDA, a cellular phone, a tablet PC, or a netbook capable of obtaining information via the Internet. The user may input information using a small keyboard (in the case of a PDA-type phone), a keypad (in the case of a typical cellular phone) or a touch screen (in the case of a PDA).

The client devices may include an antenna 182 and receiver 183 which may be used to scan the wireless network spectrum and identify local wireless network signals. For example, the antenna may receive "beacon" messages and send them to the receiver which demodulates the information to identify wireless network access points. In one example, these beacon messages may be IEEE 802.11 management frames transmitted by access points to announce themselves to potential wireless network users. These frames may contain Service Set Identifiers ("SSID") information as well as physical layer parameters that assist devices in connecting to the wireless network. The beacon messages may also include additional network access information which also assists devices in accessing the network, including whether the access point is accepting new users, whether the data is encrypted, and which type of authentication is being used, for example, no authentication (open to all), password based, web-portable based, or Media Access Control ("MAC") address based. However, it will be understood that data collected in accordance with this disclosure may be limited to the information discussed above, for example MAC addresses, SSIDs or other identifiers and signal strengths, and need not contain additional information. For example, information contained in the network traffic or payload data, such as personal information, need not be collected, and in fact, may actually be removed in order to protect the privacy of the wireless network's users.

The geographic position component 168 may comprise a GPS receiver to determine the device's latitude, longitude and/or altitude position. The geographic position component may also comprise software for determining the position of the device based on other signals received at the client device 160, such as an IP address or signals received at a cell phone's antenna from one or more base stations if the client device is a cell phone.

The client devices may also include an orientation device 169, for example an accelerometer, gyroscope, compass and orientation-related software to determine the direction in which the device is oriented. By way of example only, the device may determine its pitch, yaw or roll (or changes thereto) relative to the direction of gravity or a plane perpendicular thereto. In that regard, it will be understood that a client device's provision of orientation data as set forth herein may be provided automatically to the client device. In some examples, the accelerometer, gyroscope and/or compass devices may be used as a pedometer to track a client device's movements (for example, the number of steps by a user when the client device is in a user's hand or pocket, etc.).

Instructions 164 may also include data collection software for collecting the information identified during the scanning and transmitting the information to a server. The data collection software may include applications or "widgets" available for a wide variety of mobile phones. For portable computers, data collection functionality may be included in toolbars and other such browser add-ons which may be used with a variety of browser programs. Data may also be collected by devices equipped with wireless network scanning gear and a receiver which monitors a wireless network frequency spectrum. For example, many wireless network access points may operate in the 2.4 GHz frequency band and the signals may be based on 802.11, 802.11b, g, n, or other such standards.

Data 163 of the client device may include data points generated by the data collection software. The data points may include wireless network access point identifies (such as SSIDs or MAC addresses) as well as the associated signal strengths. Again, this information need not include any payload data or personal information. In some examples, the data points may also include accelerometer, gyroscope, GPS, or other sensor data.

Data 163 may also include indoor route data provided by the server. This route data may be followed by a user who has signed up or opted to participate (a "participant") in walking his or her client device along the route in order to collect the data points described above.

Participants may be required to take an affirmative step in order to select or "opt-in" to participate. For example, participants may be required to sign in to a service before receiving the route or providing any information. Participants may be paid for the data provided and may also be provided with an explanation of how and why their feedback is being used. Similarly, participants may be provided with the opportunity to cease participation temporarily or permanently at any time.

Data 134 of server 110 may include floor plan or map data 136. The floor plan data may include the outline of a building, for example, a footprint. The floor plan may also include various constraints within the footprint such as walls, windows, doors, and other features as well as measurements or reference data sufficient for the computer to determine the length of a wall or size of a room, etc. This floor plan may, for example, be provided by the representative of the building who has requested that a wireless network model of the building be generated.

Figure 3:
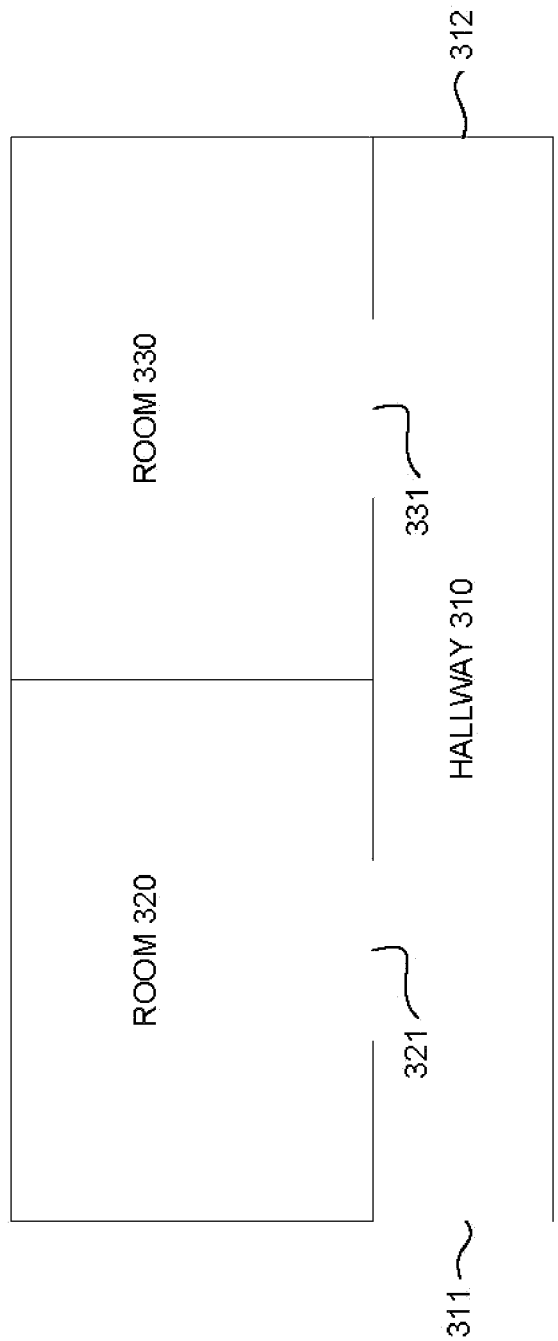
FIG. 3 is a floor plan in accordance with an exemplary embodiment.

FIG. 3 depicts an exemplary floor plan 300. Floor plan 300 includes a hallway 310, and two rooms, room 320 and room 330, off of hallway 310. One end of hallway 310 begins in an entrance 311 to the hallway. The opposite end of hallway 310 ends in wall 312. Rooms 320 and 330 are also associated with entrances 321 and 331, which may include, for example, doors or simply openings in the walls of the building through which a person may walk. While the examples used herein include fairly simple floor plans, it will be understood that floor plans (or maps) in accordance with the aspects disclosed herein may be much more complex or simpler based on the attributes of a particular building.

Returning to FIG. 1, data 134 may also include walking templates 138. The walking templates may define possible approaches for walking through a building in order to collect the wireless network data as described above. For example, the walking templates may include various patterns such as zigzagging at various angles, walking along or near walls, crossing a portion of a hallway or a room and changing directions, etc.

Figure 4A:
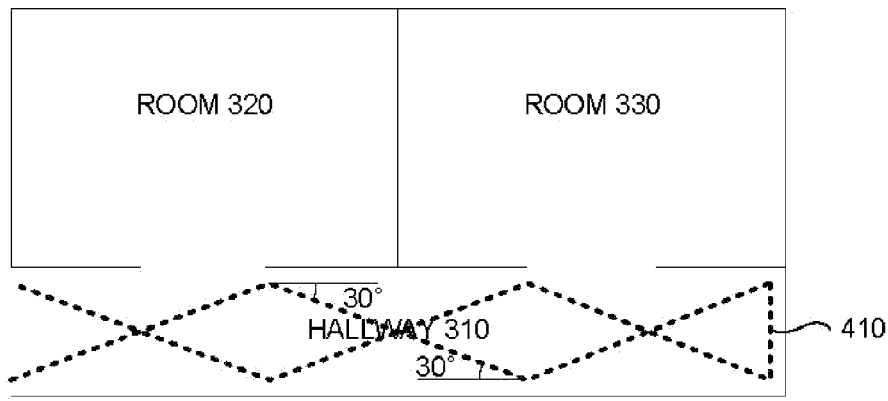
FIGS. 4A-4C are floor plans and routes in accordance with an exemplary embodiment.
Figure 4B:
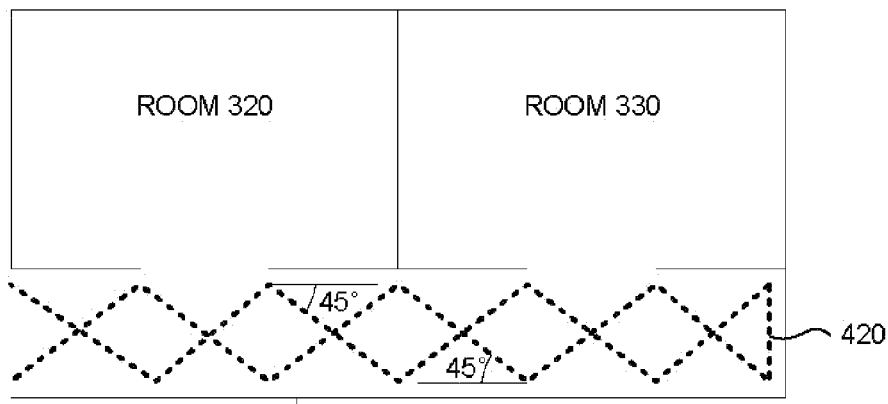

FIGS. 4A and 4B depict various exemplary templates for zigzag walking along a hallway. For example, a walking template may involve a zigzagging pattern with a 30 degree angle from the hallway's walls. FIG. 4A depicts an example of a 30 degree template 410 along hallway 310. In another example, a walking template may involve a narrower zigzagging pattern at 45 degrees which may allow for the collection of more data points than the 30 degree pattern, but may also require significantly more time to walk. FIG. 4A depicts an example of a 45 degree template 420 along hallway 310.

Figure 4C:
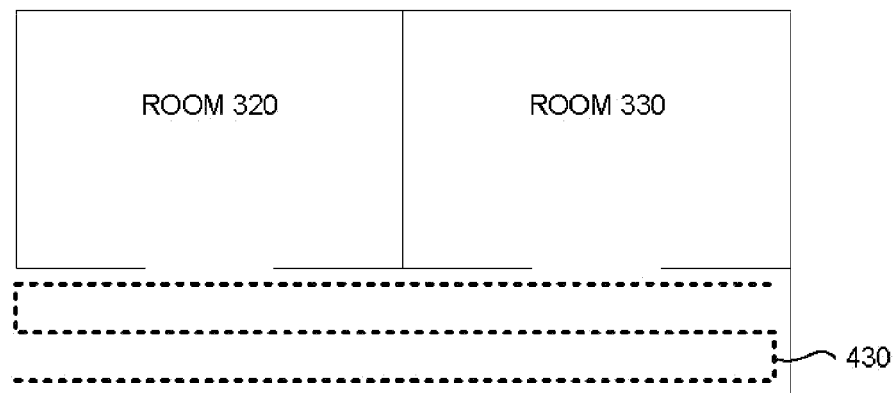

The walking templates need not be limited to zigzagging patterns. For example, another template may involve walking in a first direction through a hallway along one wall, crossing to the center of the hallway, walking in a second direction through the middle of the hallway, crossing to the second wall of the hallway and walking in the first direction along the second wall. FIG. 4C depicts an example of a crossing template 430.

Figure 5A:
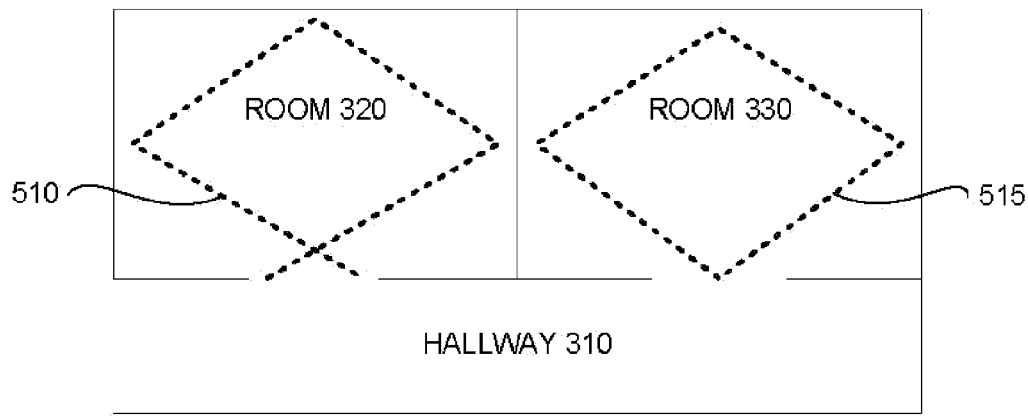
FIGS. 5A-5C are floor plans and routes in accordance with another exemplary embodiment.

In addition to templates for straight hallways, other templates may be used for indoor spaces of other shapes. For example, various templates may be utilized for square or rectangular shaped rooms as well. As shown in FIG. 5A template 510 may involve zigzagging through a room such that the room is traversed in a single diamond shape. Depending upon the starting and ending points of the room, the diamond may have a different shape, as demonstrated by templates 510 and 515. As shown in FIG. 5A, template 520 may involve zigzagging through a room such that the room is traversed in multiple diamond shapes. Depending upon the starting and ending points of the room, the diamonds may have different shapes, as demonstrated by templates 520 and 525. Again, the narrower the zigzagging (or the more diamonds) the greater the amount of data points collected, but also the longer it may take a user to walk through the room.

Figure 5B:
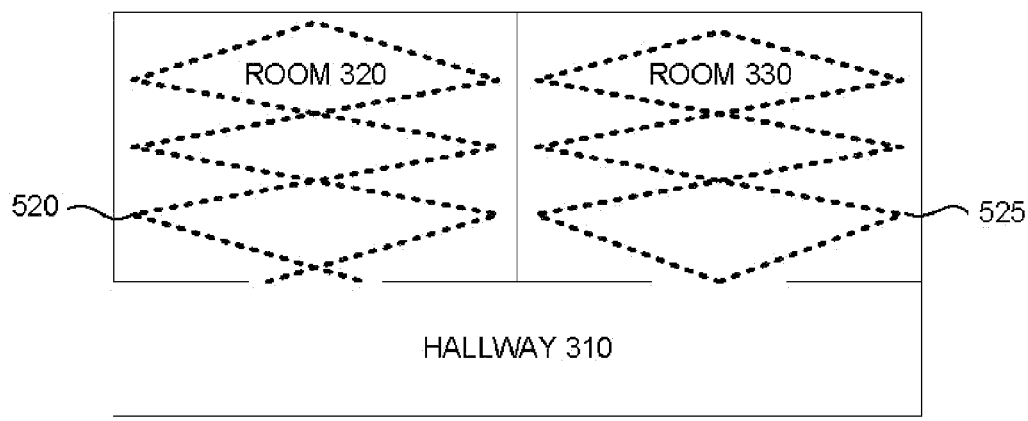
Figure 5C:
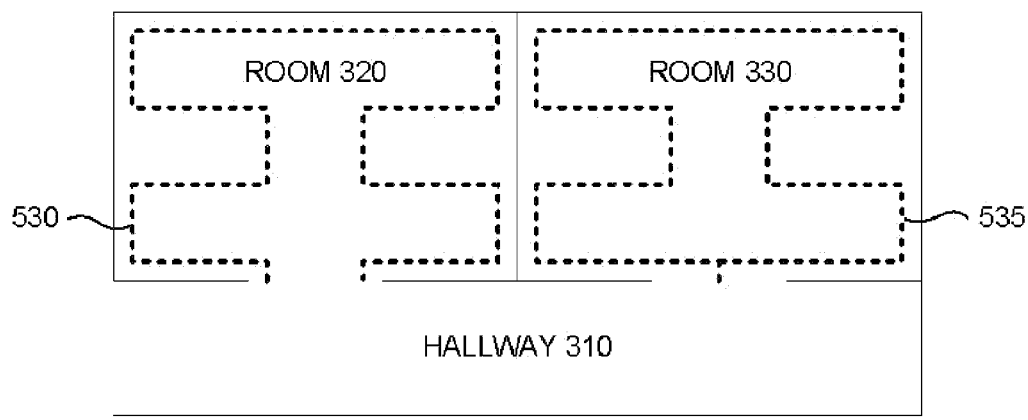

FIG. 5B depicts another exemplary walking template 530 for a room. This template may be similar to template 430. In this example, the template may follow one wall in a first direction, turning 90 degrees and crossing some portion of the room, turning another 90 degrees and moving in a second direction (opposite the first direction), turning another 90 degrees and again crossing some portion of the room, etc. Again, depending upon the starting and ending points of the room, the template may have a different shape, as demonstrated by templates 530 and 535.

Figure 6:
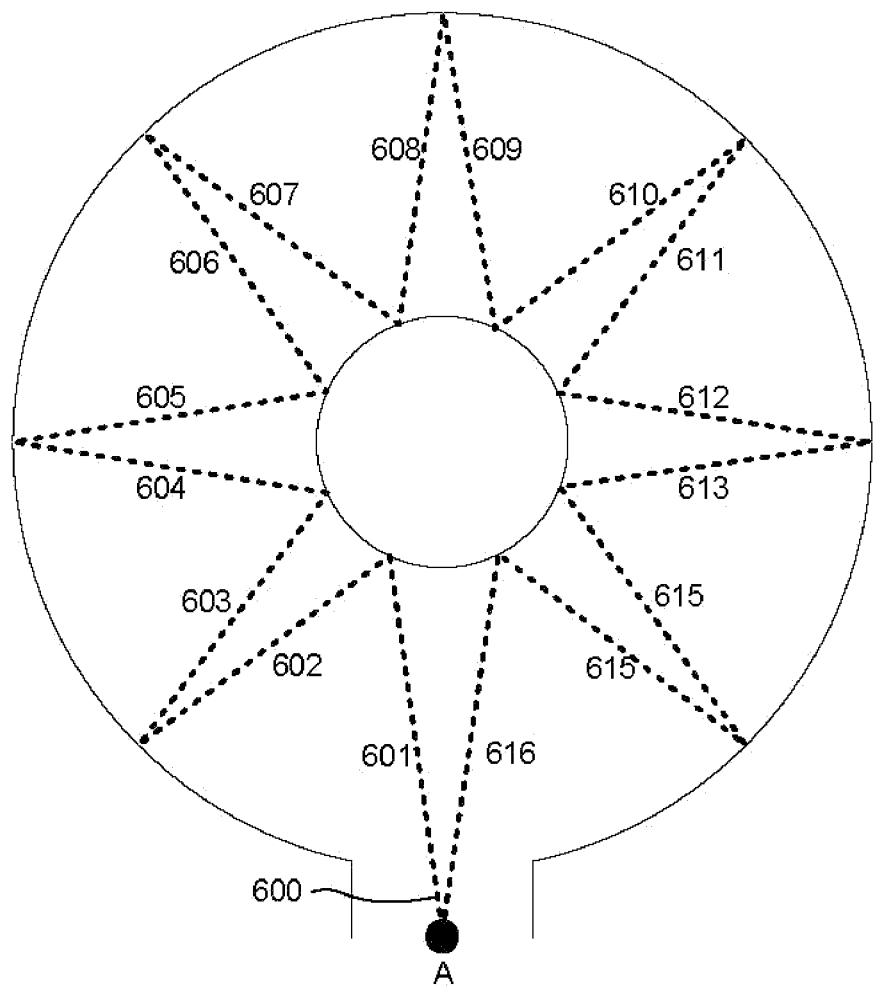
FIG. 6 is a floor plan in accordance with an exemplary embodiment.

The walking templates as used herein need not be restricted to patterns for walking through a straight hallway or a rectangular room. For example, as shown in FIG. 6, a template 600 may involve zigzagging through a circular hallway. In this example, the template begins and ends at location A, following the sequence of segments from 601 to 616.

As described in more detail below, these walking templates may be used in conjunction with the floor plans in order to generate routes for collecting the data points described above.

In addition to the operations described above and illustrated in the figures, various operations will now be described. It should also be understood that the following operations do not have to be performed in the precise order described below. Rather, various steps can be handled in a different order or simultaneously, and steps may be omitted or added.

A server may select a floor plan in order to identify a route for collecting data. For example, as describe above, a representative of a building (such as an owner, administrator, executive, proprietor, etc.) may request that a wireless network model of the building be generated in order to provide navigation services inside the building. Thus, the server may select the floor plan based on the need to collect data from a particular building. In another example, the server may select a particular floor plan based on the availability of users to collect data at a particular building. For example, a participant may send a notification to the server. The notification may inform the server that the participant will be at a particular building (or some area within the building) in the near future. In response, the server may access a floor plan for the particular building. In yet another example, the server may randomly select the floor plan from a set of floor plans in order to generate a route or routes through a building in advance and store the routes until they may be assigned to participants.

The server may also identify a time parameter. The time parameter may be used to limit the total time for a participant in order to manage resources. The time parameter may include a maximum time (such as 2 hours), a minimum time (such as 10 minutes), or a range of times (such as from 10 minutes to 5 hours). For example, the participant may identify a time parameter (e.g., "I only want to do this for minutes") and inputting it into the participant's client device. The participant may also select the time parameter from a list of pre-determined time parameters. The client device may then transmit the inputted time parameter to the server. The time parameter may also be provided by the representative of the building and input into the server by a system administrator. For example, the representative may only be willing to pay participants to walk for 10 hours through the building. The time parameter may also be a fixed value. For example, the time parameter may always be 20 minutes or may vary based on the size of a floor plan or portion of a floor plan that requires modeling. For example, a larger floor plan may require a higher minimum time parameter.

The server may also identify a walking speed. The walking speed may be an estimate of how quickly a participant is expected to walk. This speed may be provided by the particular participant (e.g., "I walk at 3 miles per hour") or may be an average expected walking speed of a plurality of participants. Again the walking speed may be retrieved from storage accessible by the server or may be received, for example, from the participant's client device.

The server may also identify an optimization goal. The optimization goal may define some density of data points collected in a given indoor space. An optimization goal may require that at least one data point be recorded for a particular area (length by width). For example, one optimization goal may require that a data point be no more than some distance (for example, 1 or 3 meters) from the data point's nearest neighboring data point. In other examples, an optimization goal may include collecting a data point at the center of every room or along every wall and down the middle of a hallway. In yet another example, the optimization goal may include a desired density of data points per area taken from a given direction or set of directions. In addition, the optimization goal may include a plurality of sub-goals, for example, there may be a goal for rooms and another for hallways, a goal for each particular room and each particular hallway, or a goal for particular sections of a building (such as the East wing or the third floor).

The server then uses the optimization goal, the walking speed, and the time parameter to identify a set of templates for the selected floor plan. For example, the templates may be "fitted" to each area of the selected floor plan, such as each room, hallway, stairwell, etc. For example, the templates may not match the actual floor plan exactly. Thus, the fitting may include scaling (stretching or shrinking), rotating, or repeating the templates.

Figure 7A:
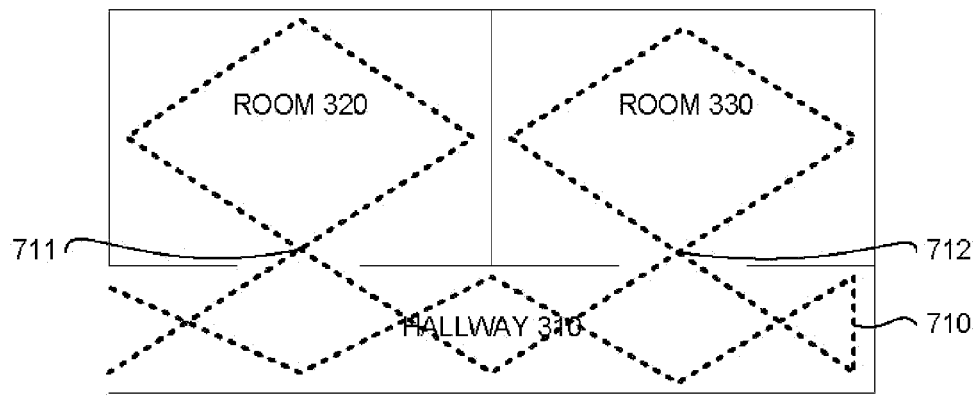
FIGS. 7A-7C are floor plans and routes in accordance with an exemplary embodiment.
Figure 7B:
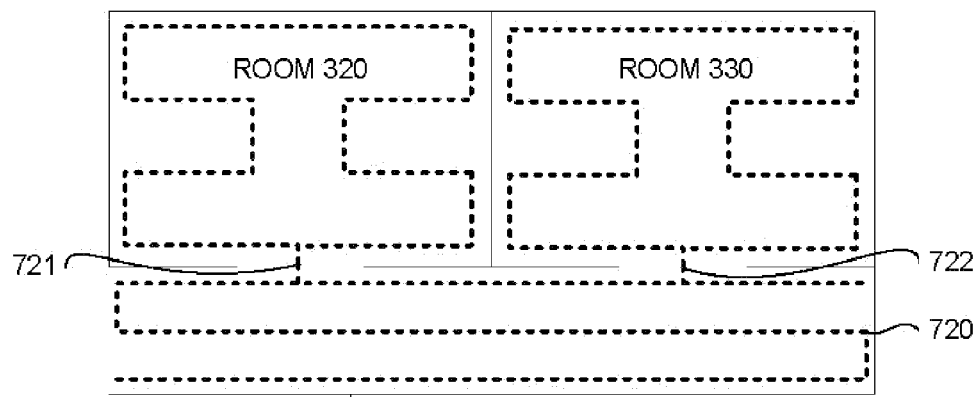
Figure 7C:
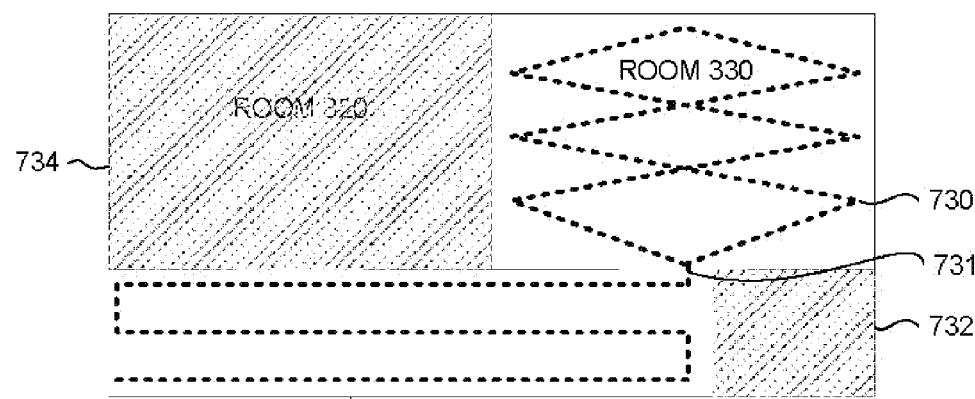

The set of templates may be used to generate a route through the entire indoor space. For example, FIGS. 7A and 7B depict two alternative routes through the indoor space. Route 710 is based on templates 410 and 515 and route 720 is based on templates 430 and 535. In another example, FIG. 7C depicts a route through only a portion of an indoor space. In this example, area 732 and 734 have been excluded from the routing (shown in shading), for example, because modeling of these areas may not be required or permitted. In this case, route 730 is based on templates 430 and 425.

Once the set of templates has been identified, the templates may be connected at particular points to generate an optimized route with a starting and an ending point. For example, the templates may be adjusted to meet one another at convenient points or by connecting a short line between the templates, as shown by connection points 711-712, and connection lines 721, 722, and 731. These connections create a route between the hallways and rooms. This route may then be transmitted to a client device. The start and end points of the route may also be identified as part of the optimization.

Figure 8:
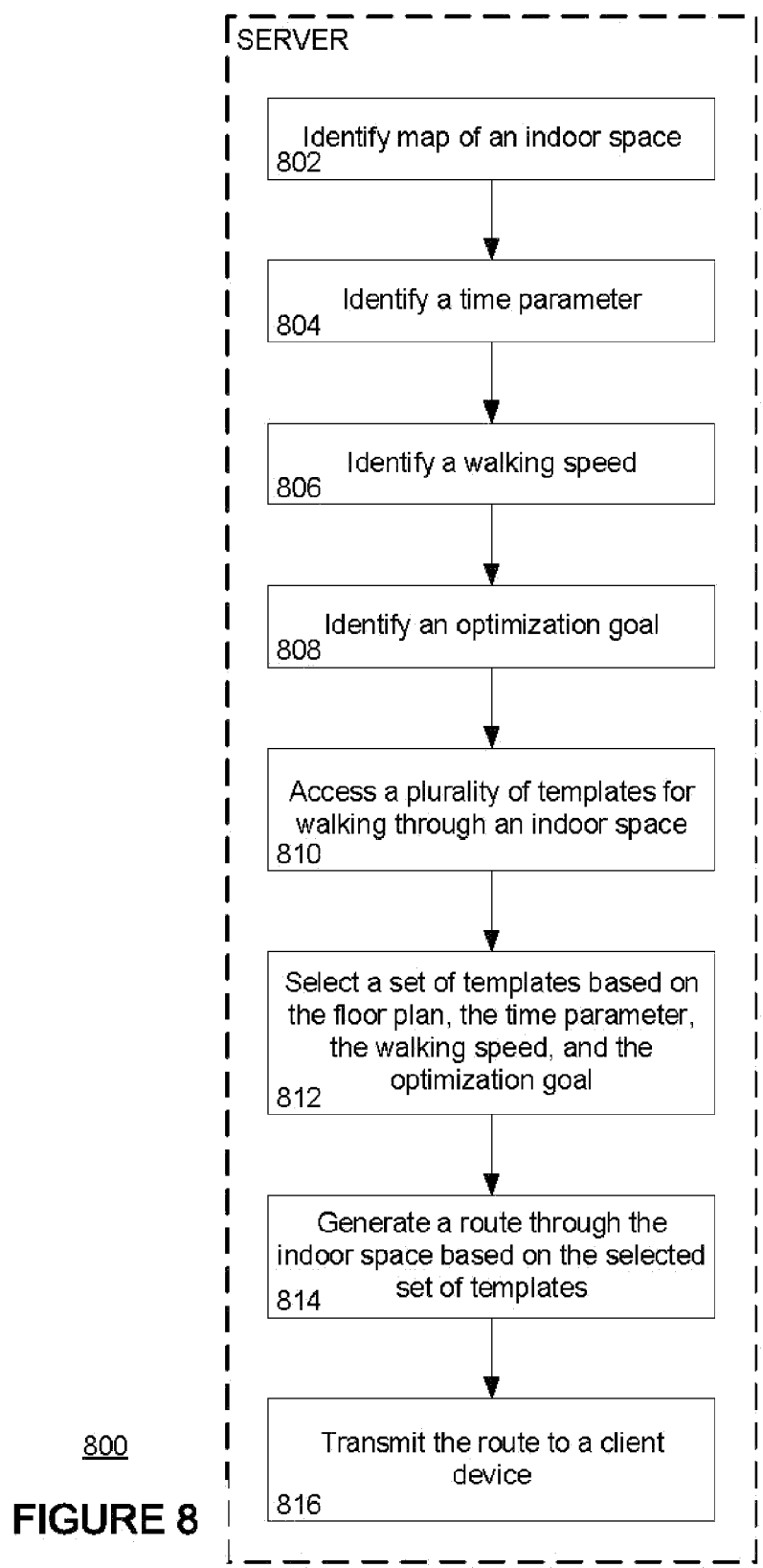
FIG. 8 is flow diagram in accordance with an exemplary embodiment.

Flow diagram 800 of FIG. 8 depicts aspects of the disclosure. At block 802, the server may identify a map (or floor plan) of an indoor space. For example, the map may be identified based on information received from a participant or provided to the server by an administrator. At block 804, the server may identify a time parameter. Again, the time parameter may be identified based on information received from the participant or provided to the server by an administrator. At block 806, the server identifies a walking speed. This walking speed may also be identified based on information received from the participant or retrieved from memory accessible by the server. At block 808, the server also identifies an optimization goal. For example, the optimization goal may be a specific density of data points for the map or for sections of the map.

At block 810, the server accesses a plurality of templates for walking through the indoor space. The server selects a set of templates based on the floor plan, the time parameter, the walking speed, and the optimization goal at block 812. The selected set of templates is used to generate a route through the indoor space at block 814. The server transmits the route to a client device at block 816.

Figure 9:
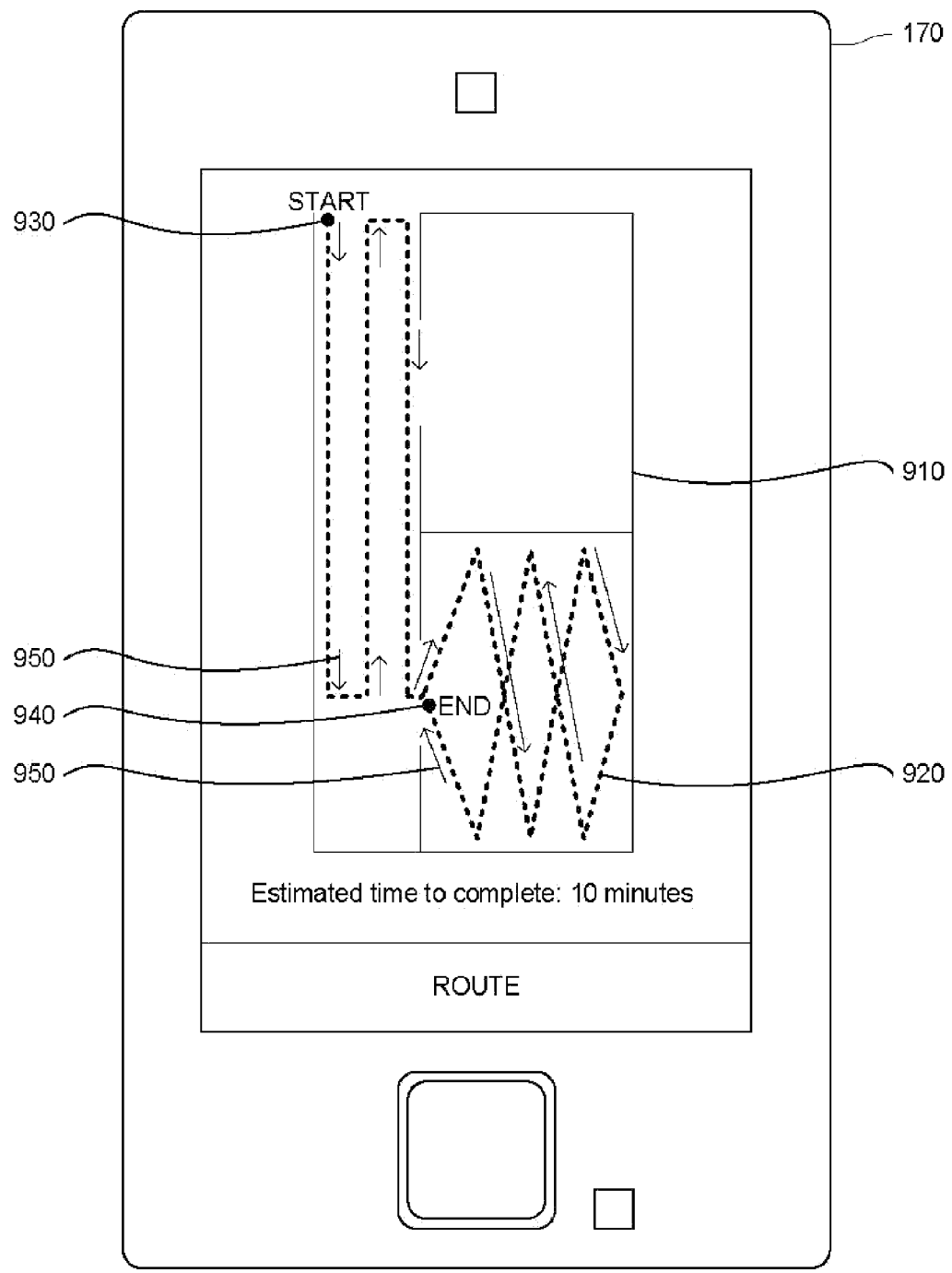
FIG. 9 is a client device and screen shot in accordance with an exemplary embodiment.

Once the client device receives the route, a participant may follow the route through the building and collect data. For example, the client device may display a map for the participant to follow. As shown in FIG. 9, client device 170 displays a map 910 (or floor plan) as well as a route 920 through the indoor space. This example also provides the participant with a starting point 930, an ending point 940, and one or more direction arrows 950 for instructing the participant regarding the directionality of the route. The display may also include an estimated time to complete the route. This estimated time may be based on the time parameter, the walking speed, and/or the length of the route.

While the participant follows the route, the client device may record the data points as a time-indexed log of accelerometer and gyroscope measurements and wireless network information. For example, the log may include a timestamp, orientation and compass measurements, wireless network measurements (MAC address and signals strengths), as well as other measurements of wireless networks such as Bluetooth, etc. if available. Again, this data need not include any payload information, but only that necessary to identify a wireless network access point (or other wireless network identifier) and its associated signal strength. For every unit of time along the route, the client device may record a wireless network data point of that location. For example, a wireless network data point may be recorded periodically, such as every 0.1 seconds. This data may be transmitted to the server as it is collected or the participant may select to transmit the data once the route has been completed.

Figure 10:
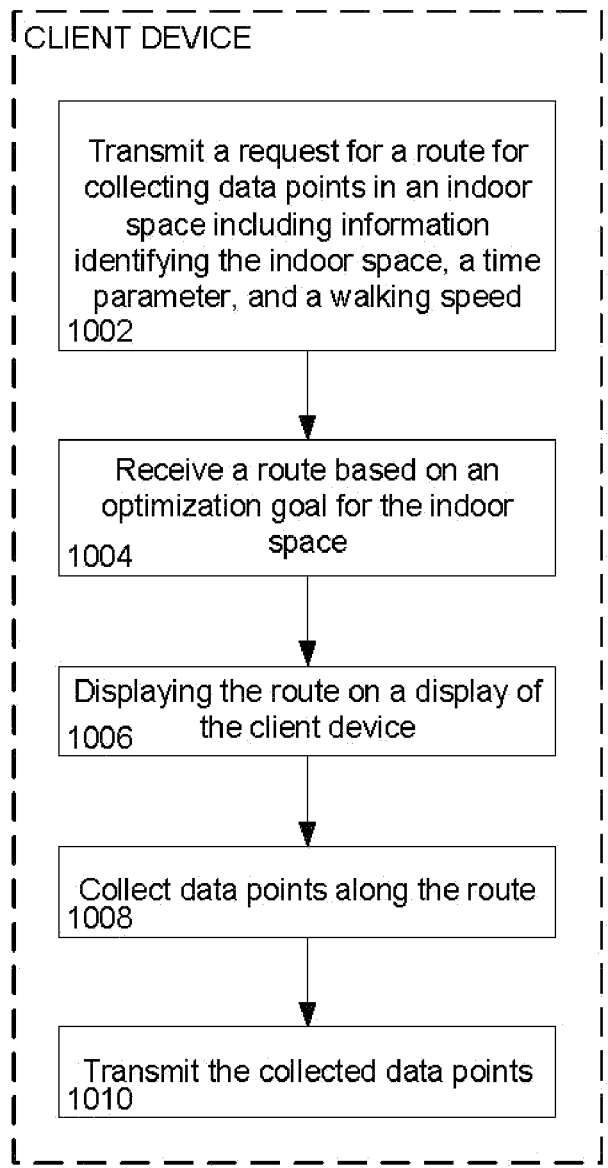
FIG. 10 is another flow diagram in accordance with an exemplary embodiment.

Flow diagram 1000 of FIG. 10 depicts aspects of the disclosure. At block 1002, a client device transmits a request to a server for a route for collecting data points in an indoor space. The request includes information identifying the indoor space, a time parameter, and a walking speed. For example, this information may be inputted into the client device by the participant. In response, the client device may receive a route based on an optimization goal for the indoor space at block 1004. The route is displayed on a display of the client device at block 1006. The participant then walks the client device along the route in order to allow the client device to collect data points at block 1008. The collected data points are then transmitted to the server at block 1010.

For the purposes of simplicity, the examples herein are directed to single story buildings. However, it will be understood that the systems and methods described herein may be utilized in conjunction with multi-story buildings. For example, a route may include using stairs, elevators, escalators, etc. in order to change floors and move through a building and collect the data as described above.

In addition, while the examples herein are presented utilizing wireless network data points, other signals may also be used. Ultrasound, Ultra-Wide Band (UWB), Bluetooth, partial or differential GPS signals, and other signals may be recorded as a particular fingerprint or included in a wireless network fingerprint. For example, UWB is a technology that may be well suited for doing indoor localization but is presently not widely deployed. As use of UWB hardware increases, for example, if this technology becomes less expensive and more widespread, it will be understood that UWB signals and signal strengths alone or in combination with wireless network signals and signal strengths. As long as there some beacon messages for a particular signal in a building, and the client device is able to receive and identify relevant data (typically an identifier and associated signal strength) from these beacons the signals may be included in the survey data.

As these and other variations and combinations of the features discussed above can be utilized without departing from the subject matter defined by the claims, the foregoing description of exemplary embodiments should be taken by way of illustration rather than by way of limitation of the subject matter defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method for generating routes for collecting data points in an indoor space, the method comprising:
    identifying a map of the indoor space;

identifying an optimization goal for collecting data points in the indoor space;

accessing a plurality of templates including strategies for walking through indoor spaces;

selecting, by a processor, a set of templates from the plurality of templates based on the map and the optimization goal; and generating a route for collecting data points in the indoor space based on the selected set of templates.

2. The method of claim 1, further comprising:

receiving, from a client device, information identifying the indoor space;

wherein identifying the map is based on the received information identifying the indoor space.

3. The method of claim 2, wherein identifying the time parameter includes receiving, from a client device, a time parameter of a user.

4. The method of claim 1, further comprising identifying a time parameter and wherein selecting the set of templates is further based on the identified time parameter.

5. The method of claim 1, further comprising identifying a walking speed and wherein selecting the set of templates is further based on the identified walking speed.

6. The method of claim 5, wherein identifying the walking speed includes receiving, from a client device, a walking speed of a user.

7. The method of claim 1, wherein the optimization goal includes a specific density of data points in the indoor space.

8. The method of claim 1, wherein the map of the indoor space includes a plurality of hallways, the strategies for walking through the indoor spaces include strategies for walking through hallways, and the subset of templates are selected based on the plurality of hallways and the strategies for walking through hallways.

9. The method of claim 1, wherein the map of the indoor space includes a plurality of rooms, the strategies for walking through the indoor spaces include strategies for walking through rooms, and the subset of templates are selected based on the plurality of rooms and the strategies for walking through rooms.

10. A method of collecting data points along a route through an indoor space, the method comprising:

transmitting, to a server, a request for the route, the request including information identifying the indoor space;

receiving a route based on the indoor space and an optimization goal;

displaying, by a processor, the route on a display of a client device;

collecting data points along the route, each data point including wireless network access location identifiers and associated signal strengths; and transmitting the collected data points to the server.

11. The method of claim 10, wherein the request further includes a time parameter and the route is based on the time parameter.

12. The method of claim 10, wherein the request further includes a walking speed and the route is based on the walking speed.

13. The method of claim 12, further comprising receiving, by the client device, input from a user identifying the walking speed.

14. A device for generating routes for collecting data points in an indoor space, the device comprising:

memory storing a plurality of templates including strategies for walking through indoor spaces; and a processor coupled to the memory, the processor being operable to:

identify a map of the indoor space;

identify an optimization goal for collecting data points in the indoor space;

select a set of templates from the stored plurality of templates based on the map and the optimization goal; and generate a route for collecting data points in the indoor space based on the selected set of templates.

15. The device of claim 14, wherein the processor is further operable to identify a time parameter and the processor selects the set of templates based on the time parameter.

16. The device of claim 14, wherein the processor is further operable to identify a walking speed and the processor selects the set of templates based on the walking speed.

17. The device of claim 14, wherein the processor is further operable to receive, from a client device, a walking speed of a user the processor selects the set of templates based on the received walking speed.

18. A device for collecting data points along a route through an indoor space, the device comprising:

a display; and a processor coupled to the display, the processor being operable to:

transmit to a server, a request for the route, the request including information identifying the indoor space;

receive a route based on the indoor space, a time parameter, a walking speed, and an optimization goal;

display the route on the display;

collect data points along the route, each data point including wireless network access location identifiers and associated signal strengths; and transmit the collected data points to the server.

19. The device of claim 18, wherein the processor is further operable to receive input identifying the time parameter from a user and to transmit the time parameter to the server.

20. The device of claim 18, wherein the processor is further operable to receive input identifying the walking speed from a user and to transmit the walking speed to the server.

* * * * *

UNITED STATES PATENT AND TRADEMARK OFFICE
CERTIFICATE OF CORRECTION

| | | |
|---|---|---|
| PATENT NO. | : 8,412,183 B1 | Page 1 of 1 |
| APPLICATION NO. | : 13/108127 | |
| DATED | : April 2, 2013 | |
| INVENTOR(S) | : Mohammed Waleed Kadous et al. | |

It is certified that error appears in the above-identified patent and that said Letters Patent is hereby corrected as shown below:

IN THE CLAIMS

Column 11, line 33, delete "are" and insert therefor --is--; line 39, delete "are" and insert therefor --is--.

Column 12, line 31, after "user" insert --, and--.

Signed and Sealed this
Twenty-sixth Day of January, 2016

Michelle K. Lee
*Director of the United States Patent and Trademark Office*